United States Patent [19]

Koivu

[11] Patent Number: 5,572,510
[45] Date of Patent: Nov. 5, 1996

[54] METHOD AND ARRANGEMENT FOR MEASURING THE CONDITION OF A BASE STATION

[75] Inventor: Vesa Koivu, Oulu, Finland

[73] Assignee: Nokia Telecommunications Oy, Espoo, Finland

[21] Appl. No.: 374,626

[22] PCT Filed: May 17, 1994

[86] PCT No.: PCT/FI94/00196

§ 371 Date: Mar. 8, 1995

§ 102(e) Date: Mar. 8, 1995

[87] PCT Pub. No.: WO94/27385

PCT Pub. Date: Nov. 24, 1994

[30] Foreign Application Priority Data

May 18, 1993 [FI] Finland .................................. 932259

[51] Int. Cl.⁶ ........................ H04B 7/212; H04J 3/16; H04Q 7/20
[52] U.S. Cl. ...................... 370/13; 370/95.3; 379/59; 455/33.1; 455/56.1; 455/67.1
[58] Field of Search .................. 370/13, 13.1, 24, 370/29, 95.1, 95.3, 110.1; 379/58, 59, 60; 455/33.1, 33.2, 34.1, 34.2, 49.1, 53.1, 56.1, 67.1, 67.3, 67.4, 54.1

[56] References Cited

U.S. PATENT DOCUMENTS

| | | | |
|---|---|---|---|
| 5,287,544 | 2/1994 | Menich et al. | 455/33.1 |
| 5,321,690 | 6/1994 | Sato | 370/95.3 |
| 5,327,575 | 7/1994 | Menich et al. | 455/33.2 |
| 5,355,514 | 10/1994 | Borg | 455/33.1 |
| 5,379,447 | 1/1995 | Bonta et al. | 455/33.2 |
| 5,398,247 | 3/1995 | Delprat et al. | 370/95.3 |
| 5,442,681 | 8/1995 | Kotzin et al. | 379/59 |

FOREIGN PATENT DOCUMENTS

| | | |
|---|---|---|
| 261828 | 3/1988 | European Pat. Off. |
| 906635 | 6/1990 | WIPO . |
| 923744 | 3/1992 | WIPO . |

*Primary Examiner*—Alphus H. Hsu
*Attorney, Agent, or Firm*—Cushman Darby & Cushman, L.L.P.

[57] ABSTRACT

The invention relates to a method for measuring the condition of a receiving antenna of a base station in a TDMA radio system, in which TDMA channel structures according to ETSI/GSM recommendation 05.02 are used, by means of test measurements performed in predetermined TDMA time slots. According to the invention, the test measurements are performed, without disturbing the normal operation of the base station and without allocating a traffic channel, during time slots of an IDLE frame of a channel structure TCH/F+SACCH/TF and/or during time slots of an IDLE frame of a channel structure SDCCH/8 according to the ETSI/GSM recommendation 05.02.

11 Claims, 3 Drawing Sheets

TRANSMISSION

Fu1

| C C H | S D C C H | T C H 2 | T C H 3 | T C H 4 | T C H 5 | T C H 6 | T C H 7 |

| T C H 0 | T C H 1 | T C H 2 | T C H 3 | T C H 4 | T C H 5 | T C H 6 | T C H 7 |

FIG. 1B

RECEPTION
Fl1

| T C H 5 | T C H 6 | T C H 7 | C C H | S D C C H | T C H 2 | T C H 3 | T C H 4 |

| T C H 5 | T C H 6 | T C H 7 | T C H 0 | T C H 1 | T C H 2 | T C H 3 | T C H 4 |

FIG. 2B

| 0 | 1 | 2 | | 2045 | 2046 | 2047 |

FIG. 3

| 0 | 1 | 2 | 3 | | | | | 26/51 |

FIG. 4

| 0 | 1 | 2 | | | 26/50 |

FIG. 5

| 0 | 1 | 2 | 3 | 4 | 5 | 6 | 7 |

FIG. 6

TCH/F - MULTIFRAME

| T C H | T C H | T C H | T C H | T C H | T C H | T C H | T C H | T C H | T C H | T C H | T C H | S A C C H | T C H | T C H | T C H | T C H | T C H | T C H | T C H | T C H | T C H | T C H | T C H | T C H | I D L E |

METHOD AND ARRANGEMENT FOR MEASURING THE CONDITION OF A BASE STATION

BACKGROUND OF THE INVENTION

The invention relates to a method and arrangements for measuring the condition of a base station in a TDMA radio system, in which are used TDMA channel structures according to ETSI/GSM recommendation 05.02, by means of test measurements performed in predetermined TDMA time slots.

One of the most critical factors in radio systems, for instance in cellular radio telephone systems, is the quality of a radio link between a base station and a mobile radio station. The quality of this radio link is essentially affected by the condition of radio sections of the base station, i.e. antennas and transceivers. Therefore, it is important to be able to monitor the condition of the radio sections of the base station by various measurements and tests.

The condition of the transmitting and receiving antennas of a base station is typically monitored by measuring the standing wave ratio thereof, i.e. electrical matching of the antennas to the remaining part of the receiver and transmitter system. This has normally been performed by means of an equipment positioned at the base station, supplying RF power through an antenna line to the antenna and measuring the power reflected from the antenna. The condition of the antenna has been concluded from the level of the signal reflected from the antenna. The measurements are usually carried out at a specific test frequency outside the normal operating frequency band of the base station, in order to avoid disturbance to the normal operation of the base station. Some equipments applying this principle are described in the Finnish Patent Application 904085 as well as in the European Patent Application 0 261 828.

The condition of transceivers as well as baseband signal processing units of a base station have been tested by an equipment looping an RF test signal sent by a transmitter to a receiver. If the sent test signal is received error free, the devices to be tested are assumed to be in a proper condition. In digital radio systems, it is possible to calculate on the basis of a comparison between transmitted and received data a Bit Error Rate (BER), which is below a predetermined limit value at a base station in a proper condition. The radio test equipment is typically connected between transmitting antenna line and receiving antenna line and it has to convert the test signal from transmission frequency to reception frequency. Some equipments of this type are described in the Finnish Patent Application 902624 and in the PCT Application WO90/06635.

New digital radio systems of the TDMA (Time Division Multiple Access) type have time-division signalling including several, typically 8, time slots at one frequency. One TDMA system is the Pan-European mobile telephone system GSM (Groupe System Mobile). Also in the digital radio systems, the test measurements have to be carried out at frequencies outside the normal frequency band of the base station, if it is not desirable to disturb the normal operation of the base station. If normal frequencies of the base station are desired to be used for the test measurements performed during the operation of the base station, it is necessary to remove one of the time slots from the "normal traffic" for test use. For this reason, a continuous monitoring of the radio sections of the base station and real-time alarms have not been possible.

SUMMARY OF THE INVENTION

One object of the invention is to implement a measurement of the condition of an antenna at frequencies actually used at a base station of a TDMA radio system without disturbing the normal operation of the base station.

This is achieved by means of a method of the type disclosed in the preamble, which method is according to the invention characterized in that the test measurements are performed in time slots of an IDLE frame of a channel structure TCH/F+SACCH/TF and/or in time slots of an IDLE frame of a channel structure SDCCH/8 according to the ETSI/GSM recommendation 05.02. (ETSI is the acronym for European Telecommunications Standards Institute, TCH/F for full rate traffic channel, SACCH/TF for TCH/F associated control channel, and SDCCH/8 for stand alone dedicated control channel.)

An aspect of the invention relates also to an arrangement for measuring the condition of a receiving antenna of a base station in a TDMA radio system using TDMA channel structures according to ETSI/GSM recommendation 05.02, by means of test measurements performed in predetermined TDMA time slots. The arrangement is characterized in that it comprises means for sending a predetermined radio frequency test signal via an antenna line to the antenna during at least one time slot of an IDLE frame of a channel structure TCH/F+SACCH/TF and/or during at least one time slot of an IDLE frame of a channel structure SDCCH/8 according to the ETSI/GSM recommendation 05.02, means for measuring the magnitude of a measuring signal component reflected from the antenna and propagated along a predetermined measuring path, means for sending a measuring signal directly towards a receiver along said measuring path during one or several time slots of said IDLE frame, means for measuring the magnitude of the measuring signal sent directly along the measuring path, means for determining the condition of the antenna on the basis of the ratio of these two measured signal magnitudes.

The invention further relates to an arrangement for measuring the condition of a base station in a TDMA radio system using TDMA channel structures according to ETSI/GSM recommendation 05.02, by means of test measurements performed in predetermined TDMA time slots. The arrangement is characterized in that it comprises means for sending a predetermined radio frequency test signal to a receiver of the base station on a radio channel during at least one time slot of an IDLE frame of a channel structure TCH/F+SACCH/TF and/or during at least one time slot of an IDLE frame of a channel structure SDCCH/8 according to the ETSI/GSM recommendation 05.02, means for determining a bit error rate on the basis of test data received by the receiver of the base station and known test data.

The ETSI/GSM recommendation 05.02 defines the channel structures to be used on the radio path at a radio interface of a GSM system. The channel structure TCH/F+SACCH/TF and the channel structure SDCCH/8 defined in the recommendation comprise at a specific position so-called IDLE frames, the use of which is not defined in any way. In the invention, the desired test measurements of the base station are performed in one or several time slots of some idle frame, whereby the measurements do not occupy time slots suitable for other traffic. Thus it is possible to monitor the base station continuously during operation by means of the invention, irrespective of the traffic situation and without affecting the traffic capacity of the base station, due to which it is possible to discover a failure in real time and to generate an alarm.

BRIEF DESCRIPTION OF THE DRAWINGS

In the following, the invention will be explained in greater detail by means of illustrative embodiments referring to the attached drawing, in which FIGS. 1A, 1B, 2A and 2B show an allocation of the time slots of two radio channels of a base station between control and traffic channel structures, FIGS. 3, 4, 5 and 6 illustrate a TDMA frame structure, FIG. 7 shows a TCH/F traffic channel structure.

DETAILED DESCRIPTION

Figure 8:
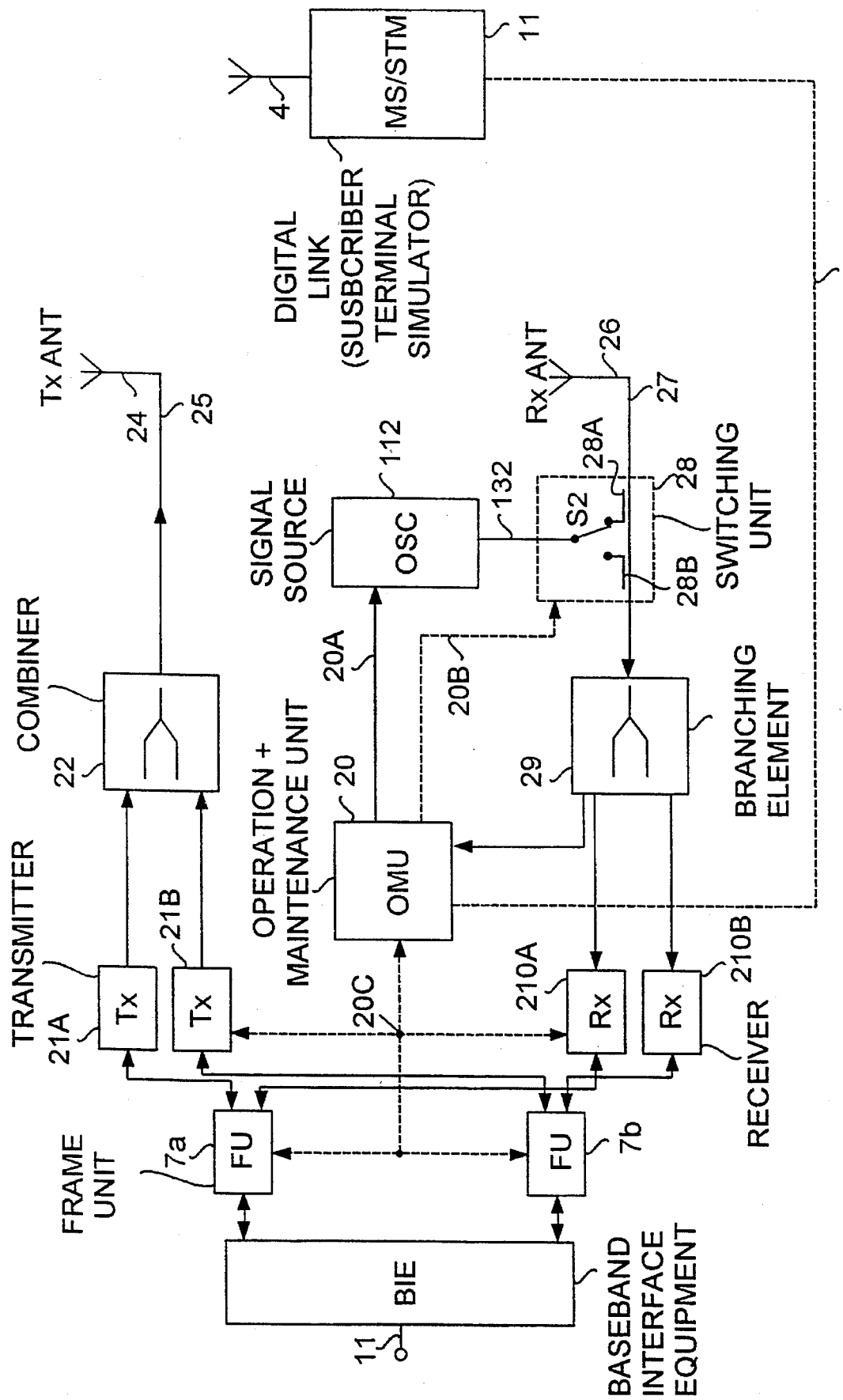
FIG. 8 is a block diagram illustrating a measuring arrangement of a base station according to the invention.

The present invention is suitable for being used for measuring the condition of a receiving antenna of a base station in TDMA radio systems using TDMA channel structures according to ETSI/GSM recommendation 05.02. Such systems are the Pan-European mobile communication system GSM and direct modifications thereof, such as DCS 1800 (Digital Communication System).

For a more detailed description of the GSM system is referred to the ETSI/GSM recommendations and to the book "The GSM System for Mobile Communications", M. Mouly & M-B. Pautet, Palaiseau, France, 1992, ISBN:2-9507190-0-7. Only features essential for the invention will be discussed separately below.

The GSM system follows FDMA (Frequency Division Multiple Access) principle, in which system are used a number of radio channels (carrier wave frequencies). On the other hand, time division multiplexing is applied to the radio channels on TDMA principle in such a way that each radio channel includes several, typically 8, time slots. The time slots are mainly used for carrying control channels (CCH) and traffic channels (TCH). Speech and data are transmitted on the traffic channels. On the control channels, a signalling is performed between a base station and mobile subscriber stations.

FIGS. 1A, 1B, 2A and 2B show shows two full-duplex radio channels, each comprising transmission and reception carriers Fu1, Fi1 and Fu2, Fi2, which are spaced apart by a duplex spacing, e.g. 45 MHz. As shown in FIGS. 1A and 2A, on the first radio channel Fu1, Fi1, the following channel structures are carried in eight time slots: one common control channel CCH, six traffic channels TCH and one Stand alone Dedicated Control Channel SDCCH. As shown in FIGS. 1B and 2A, on the second radio channel, the traffic channel TCH is carried in each time slot. Channel structures being of interest for the invention are TCH and SDCCH.

Firstly, there is, however, reason to study the frame structure of a GSM system in general, which structure is illustrated in the FIGS. 3 to 6. FIG. 6 shows one TDMA basic frame preferably including eight time slots to be used as traffic and control channels. 26 or 51 successive TDMA frames constitute one multiframe, depending on whether a traffic or a control channel structure is concerned, as is illustrated in FIG. 5. On the other hand, a superframe is constituted by 51 or 26 successive multiframes, depending on whether the multiframes comprise 26 or 51 frames, as is illustrated in FIG. 4. Further, a hyperframe is constituted by 2048 superframes, as is illustrated in FIG. 3. Alternatively, one multiframe may contain 26 TDMA frames, whereby one superframe contains 51 multiframes.

The ETSI/GSM recommendation 05.02 defines the channel structures to be used on the radio path at a radio interface of a GSM system. FIG. 7 illustrates a traffic channel structure TCH/F+SACCH/TF defined in the recommendation, the last frame of the multiframe being a so-called IDLE frame, the use of which is not defined in any way. On each traffic channel TCH of FIG. 1, for instance, an IDLE frame is thus regularly repeated, without being allocated for any use, not even when the other frames of the traffic channel have an ongoing call. According to the invention, the desired measurements of the radio sections of a base station are carried out in one or several time slots of such an IDLE frame, whereby the test measurements may take place without allocating the traffic channel, and also when the traffic channel has an ongoing call.

Corresponding IDLE frames are also found in the channel structure SDCCH/8 defined for the stand alone dedicated control channel SDCCH. When the desired test measurements are performed in these IDLE frames, they do not disturb the normal operation of the control channel.

According to the invention, the measurements to be performed in the IDLE frames described above may contain any measurements necessary for the base station. A measurement of the condition of a receiving antenna and a measurement of the condition of a receiver will be described as examples in the following.

A TDMA transceiver shown in FIG. 8 comprises at least two, preferably four, pairs of transceivers 21A, 210A and 21B, 210B, respectively, each pair constituting one full-duplex link. The outputs of the transmitter units 21A and 21B are connected by means of a combining element 22 (combiner) to a common antenna line 23 and to a common transmitting antenna 24. A receiving antenna 26 is connected via an antenna line 27 to a branching element 29 dividing the received signal to the receiver units 210A and 210B. As used herein, transmitter and receiver units primarily signify the radio sections of a transceiver.

The base station further comprises a baseband interface equipment 12 for interfacing the base station to a digital link 11, typically a PCM link, from a base station controller BSC and a mobile telephone exchange MSC. User data and control data received from the link 11 are mapped into TDMA frames of a frame unit 7, channel-coded, interleaved and modulated in a transmitter unit 21 into TDMA bursts at a desired transmission carrier frequency and supplied to the transmitting antenna 24. Correspondingly, a TDMA signal received by the receiving antenna 26 is supplied to the transceiver unit 210, in which it is demodulated from reception carrier frequency to base frequency, after which a detection, de-interleaving, channel decoding and deframing are performed in the frame unit 7, and subsequently, the received control and user data are supplied through the interface 12 to the PCM link 11.

For the measurement of the receiving antenna 26, the base station comprises a measuring signal source 112, e.g. a signal generator, generating a radio frequency measuring signal to be used for the measurement of the condition of the antenna, the frequency of the signal corresponding to some of the normal reception frequencies of the receiver, preferably within the range 800 to 1000 MHz. The output 132 of the measuring signal source 112 is connected to the antenna line 27 by means of a switching unit 28 comprising an RF switch S2 and directional couplers 28A and 28B.

The test operation is controlled by an operation and maintenance unit 20 of the base station, which unit commands, through a control line 20A, the signal source 112 to generate a test loop in a predetermined test time slot and, through a control line 20B, the switch S2 to switch either to the directional coupler 28A or 28B. The directional coupler 28A directs the measuring signal towards the antenna 26 for a reflection measurement of the antenna. The directional coupler 28B directs the signal towards the receiver for a reference measurement of the antenna measurement.

The OMU 20 also acts as a measuring unit receiving a signal from the branching element 29 and measuring the magnitude of the signal. Alternatively, receivers Rx may contain a measuring equipment, the measurement result of which is received by the OMU 20 through a line 20c.

The procedure of antenna measurement is as follows. The OMU 20 gives the signal source 112 a test command, in consequence of which a measuring signal is looped during a time slot of an idle frame used for the testing to the switch S2, which responsive to the status of line 20B switches the measuring signal to the directional coupler 28B, which sends the measuring signal directly towards the receiver. The OMU 20 measures the magnitude of the measuring signal and uses the measurement result as a reference value. Then the OMU 20 changes the status of line 20B, in consequence of which the switch S2 switches the measuring signal to the directional coupler 28A. The OMU 20 measures the magnitude of a signal component reflected from the antenna 26. From these measurement values the OMU 20 then calculates a value indicating the condition of the antenna, which value is compared with stored alarm thresholds, and the alarm is given, if necessary.

The RF sections of the reception side of a base station can be tested by sending to the receiving antenna during one or several time slots of the idle frame used for the testing a predetermined radio frequency test signal carrying predetermined digital data. In a preferred embodiment of the invention shown in FIG. 8, the test signal is sent by a subscriber terminal MS or a particular testing apparatus STM simulating a subscriber terminal, which are indicated generally by the reference numeral 11. The MS/STM 11 may be under direct control of the base station (broken line 13) in such a way that the base station may initiate sending a test signal. The test signal is received normally by the receiver unit 210 and processed normally in the frame unit 7. Additionally, the frame unit 7 calculates on the basis of the received and known test data a bit error rate indicating the condition of the receiver sections. The OMU 20 receives the calculated value via line 20C and gives the alarm, if the predetermined alarm thresholds are exceeded. The OMU 20 may further measure the level of the received signal and, if necessary, give alarms associated therewith.

In the claims, the acronyms used stand for the respective terms which are given as expansions of those acronyms in this specification.

Also the RF sections of the transmission side can be tested, if the test signal is generated by the frame unit 7 and the transmitter unit 21 and sent via the antenna 24 to the MS/STM 11, which sends the test signal back to the receiver of the base station, where the measures described above will be taken.

The figures and the description related thereto are intended only to illustrate the present invention. As to the details, the method and the apparatus according to the invention may vary within the scope of the attached claims.

I claim:
1. A method for monitoring a condition of a receiving antenna of a base station in a TDMA radio system employing TDMA channel structures according to ETSI/GSM recommendation 05.02, said method comprising:
   (a) transmitting a predetermined radio frequency test signal via an antenna line to the antenna during at least one time slot of an IDLE frame of a channel structure TCH/F+SAACH/TF according to ETSI/GSM recommendation 05.02;
   (b) measuring the magnitude of a measuring signal component reflected from the antenna and propagated along a predetermined measuring path;
   (c) transmitting the measuring signal directly towards a receiver along said measuring path during at least one of said IDLE frame;
   (d) measuring the magnitude of the measuring signal transmitted directly along the measuring path; and
   (e) determining the condition of the antenna on the basis of the ratio between the measuring signal magnitudes measured in steps (b) and (d).

2. A method for monitoring a condition of a receiving antenna of a base station in a TDMA radio system employing TDMA channel structures according to ETSI/GSM recommendation 05.02, said method comprising the steps of:
   (a) transmitting a predetermined radio frequency test signal via an antenna line to the antenna during at least one time slot of an IDLE frame of a channel structure TCH/F+SDCCH/8 according to ETSI/GSM recommendation 05.02;
   (b) measuring the magnitude of a measuring signal component reflected from the antenna and propagated along a predetermined measuring path;
   (c) transmitting the measuring signal directly towards a receiver along said measuring path during at least one time slot of said IDLE frame;
   (d) measuring the magnitude of the measuring signal transmitted directly along the measuring path; and
   (e) determining the condition of the antenna on the basis of the ratio between the measuring signal magnitudes measured in steps (b) and (d).

3. A method for monitoring a condition of a base station in a TDMA radio system employing TDMA channel structures according to ETSI/GSM recommendation 05.02, said method comprising the steps of:
   (a) transmitting known test data to a receiver of the base station on a radio channel during at least one time slot of an IDLE frame of a channel structure TCH/F+ SACCH/TF according to ETSI/GSM recommendation 05.02;
   (b) receiving said test data by a receiver of the base station; and
   (c) determining a bit error rate on the basis of said received test data and said known test data.

4. A method for measuring a condition of a base station in a TDMA radio system employing TDMA channel structures according to ETSI/GSM recommendation 05.02, said method comprising the steps of:
   (a) transmitting known test data to a receiver of the base station on a radio channel during at least one time slot of an IDLE frame of a channel structure SDCCH/8 according to ETSI/GSM recommendation 05.02;
   (b) receiving said test data by a receiver of the base station; and (c) determining a bit error rate on the basis of said received test data and said known test data.

5. An arrangement for measuring the condition of a receiving antenna of a base station in a TDMA radio system employing TDMA channel structures according to ETSI/GSM recommendation 05.02, said arrangement comprising:

means for sending a predetermined radio frequency test signal via an antenna line to the antenna during at least one time slot of an IDLE frame of a channel structure TCH/F+SACCH/TF according to ETSI/GSM recommendation 05.02;

first means for measuring the magnitude of a measuring signal component reflected from the antenna and propagated along a predetermined measuring path;

means for sending a measuring signal directly towards a receiver along said measuring path during at least one time slot of said IDLE frame;

second means for measuring the magnitude of the measuring signal sent directly along said measuring path; and means for determining the condition of the antenna on the basis of the ratio between the measuring signal magnitudes measured by said first and second measuring means.

6. An arrangement for measuring the condition of a receiving antenna of a base station in a TDMA radio system employing TDMA channel structures according to ETSI/GSM recommendation 05.02, said arrangement comprising:

means for sending a predetermined radio frequency test signal via an antenna line to the antenna during at least one time slot of an IDLE frame of a channel structure TCH/F+SACCH/TF or during at least one time slot of an IDLE frame of a channel structure SDCCH/8 according to ETSI/GSM recommendation 05.02;

first means for measuring the magnitude of a measuring signal component reflected from the antenna and propagated along a predetermined measuring path;

means for sending a measuring signal directly towards a receiver along said measuring path during at least one time slot of said IDLE frame;

second means for measuring the magnitude of the measuring signal sent directly along said measuring path; and means for determining the condition of the antenna on the basis of the ratio between the measuring signal magnitudes measured by said first and second measuring means.

7. An arrangement for measuring the condition of a base station in a TDMA radio system employing TDMA channel structures according to ETSI/GSM recommendation 05.02, said arrangement comprising:

means for sending a predetermined radio frequency test signal to a receiver of the base station on a radio channel during at least one time slot of an IDLE frame of a channel structure TCH/F+SACCH/TF or during at least one time slot of an IDLE frame of a channel structure SDCCH/8 according to ETSI/GSM recommendation 05.02;

means for determining a bit error rate on the basis of test data received by said receiver of the base station and of said known test data.

8. The arrangement according to claim 7, wherein:

said means for sending a test signal comprise a subscriber station or a separate test station.

9. The arrangement according to claim 8, wherein:

said subscriber station or test station is arranged to be controlled by the base station to be tested.

10. The arrangement according to claim 8, wherein:

said means for sending a test signal comprise transmitter sections of the base station; and said subscriber station or test station is arranged to operate as a repeater which relays the test signal to the receiver sections of the base station.

11. The arrangement according to claim 9, wherein:

said means for sending a test signal comprise transmitter sections of the base station; and said subscriber station or test station is arranged to operate as a repeater which relays the test signal to the receiver sections of the base station.

* * * * *